United States Patent [19]

Rezy

[11] Patent Number: 4,539,812
[45] Date of Patent: Sep. 10, 1985

[54] AIR COOLED EXHAUST VALVE

[75] Inventor: Bernard J. Rezy, Mobile, Ala.

[73] Assignee: Teledyne Industries, Los Angeles, Calif.

[21] Appl. No.: 71,319

[22] Filed: Aug. 30, 1979

Related U.S. Application Data

[62] Division of Ser. No. 831,384, , Pat. No. 4,184,328.

[51] Int. Cl.³ ............................................. F01N 3/10
[52] U.S. Cl. ...................................... 60/304; 60/298; 123/41.85
[58] Field of Search ................ 60/304, 305, 298, 317, 60/320, 282; 123/41.85, 41.76, 41.77

[56] References Cited

U.S. PATENT DOCUMENTS

| | | | |
|---|---|---|---|
| 2,967,518 | 1/1961 | Zuhn | 123/41.85 |
| 3,102,381 | 9/1963 | Tryhorn | 123/41.85 |
| 3,335,564 | 8/1967 | Hines | 60/305 |
| 3,635,031 | 1/1972 | Haddad | 60/305 |
| 3,759,040 | 9/1973 | Peltomaki | 60/305 |
| 3,977,188 | 8/1976 | Arnaud | 60/304 |
| 4,123,902 | 11/1978 | Iida | 60/282 |

Primary Examiner—Douglas Hart
Attorney, Agent, or Firm—Gifford, VanOphem, Sheridan, Sprinkle & Nabozny

[57] ABSTRACT

An air cooled exhaust valve provided primarily for use with an internal combustion engine, or the like. The valve is of the type having an elongated stem and an enlarged head formed at one end of the stem. The stem is axially slidably mounted within a housing while the enlarged valve head cooperates with a valve seat in the housing. A fluid passageway in the housing is connected at one end to a source of pressurized air and at its other end is open to the valve stem adjacent the valve head so that pressurized air flows axially down along the valve stem and across the valve head to cool both the valve head and stem.

1 Claim, 1 Drawing Figure

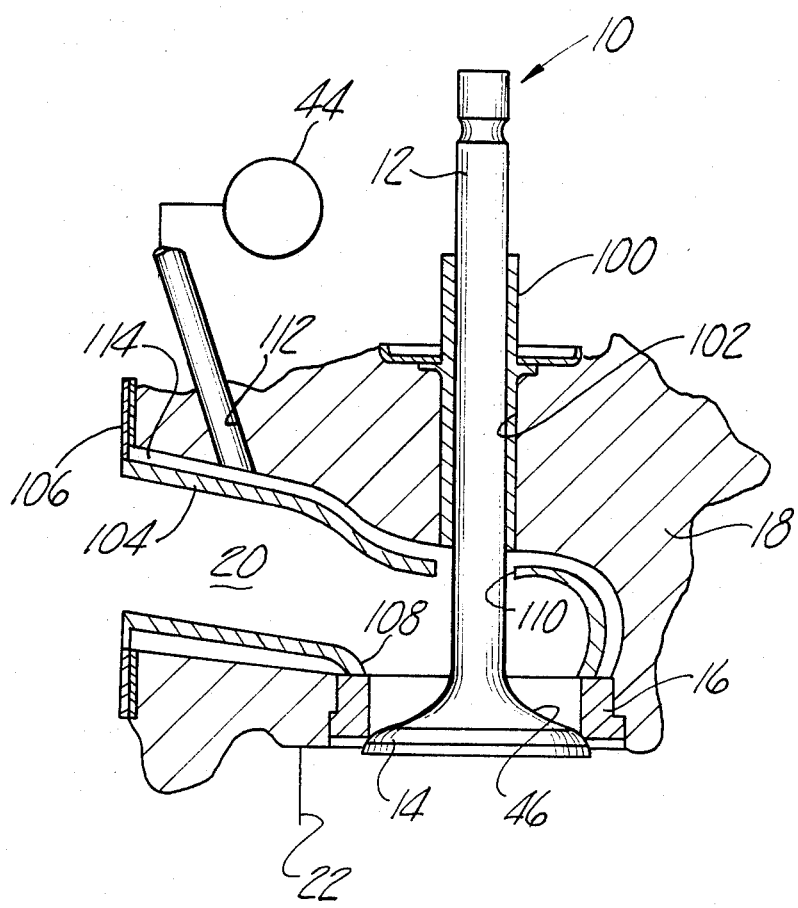

AIR COOLED EXHAUST VALVE

CROSS-REFERENCE

This is a divisional of my copending U.S. patent application Ser. No. 831,384, now U.S. Pat. No. 4,184,328, granted Jan. 22, 1980, which is incorporated herein by reference.

BACKGROUND OF THE INVENTION

I. Field of the Invention

The present invention relates generally to valve cooling means and, more particularly, to an air cooled exhaust valve for an internal combustion engine or the like.

II. Description of the Prior Art

Valves, of the type utilized in the intake and exhaust passageways for internal combustion engines typically comprise an elongated stem having an enlarged valve head formed at one end of the stem. The stem is slidably mounted via a valve guide in an engine head while the enlarged valve head cooperates with a valve seat also secured to the engine head. The valve seat, which is annular in shape, is open at one axial end to a cylinder in the engine and to the exhaust manifold passage at its other axial end. Axial displacement of the valve stem moves the valve head away from and against the valve seat to respectively permit and block fluid communication through the exhaust passageway.

As is commonly known in the art, the valve head and lower portion of the valve stem, i.e., the portion of the valve stem extending into the exhaust or intake passageway, are subjected to high temperatures from the engine exhaust gases and this is particularly true for the exhaust valve. These high temperatures require these valves to be constructed of expensive, high quality steel in order to prevent thermal warpage of the valve. However, even when using high quality steel for the construction of the valve, the previously-known valves have been known to warp and even break in operation when subjected to particularly high temperatures.

There have been several previously-known fluid cooled exhaust valves for internal combustion engines but, for a number of reasons, these previously-known fluid cooled valves have not enjoyed widespread acceptance. For example, one such valve is disclosed in U.S. Pat. No. 1,731,222 to T. S. Blair in which pressurized air is emitted through a plurality of circumferentially spaced ports formed in and around the valve seat. This previously-known valve construction is disadvantageous, however, in that the valve seat is large and cumbersome and requires expensive casting and machining. Moreover, the Blair air cooled valve operatively cools the valve only when the valve is open.

SUMMARY OF THE INVENTION

The present invention overcomes the above-mentioned disadvantages of the previously-known engine valves by providing an air cooled engine valve which is simple and economical in construction and yet effective in operation.

In brief, the engine valve according to the present invention includes a conventional elongated stem slidably mounted via a valve guide in a cylinder head of an internal combustion engine and having an enlarged valve head formed at one end of the stem. In the usual fashion, the valve head cooperates with an annular valve seat attached to the cylinder head so that axial displacement of the valve stem opens and closes the valve.

A fluid passageway is formed in the cylinder head so that one end of the fluid passageway is open to the valve stem adjacent the valve head. The other end of the passageway is connected to a source of pressurized air. Consequently, the air from the pressurized air source flows downwardly across the lower portion of the valve stem and across the upper axial end of the valve head to thereby cool both the valve stem and the valve head.

BRIEF DESCRIPTION OF THE DRAWING

A better understanding of the present invention will be had upon reference to the following detailed description when read in conjunction with the accompanying drawing, wherein like reference characters refer to like parts throughout the several views and in which:

The FIGURE of the drawing is a fragmentary cross-sectional view of an air cooled valve according to the present invention.

DETAILED DESCRIPTION OF THE PRESENT INVENTION

A valve 10 according to the present invention is shown in the FIGURE as an exhaust valve for an internal combustion engine. It will be understood, however, that this is by way of example only and that the valve 10 can be used in applications other than an engine exhaust valve. For example, the valve 10 can be employed in a compressor and for that reason, the term "engine" shall collectively refer to engines, compressors, and the like.

The valve 10 comprises an elongated valve stem 12 having an enlarged diameter, circular valve head 14 formed at its lowermost end. The valve stem 12 and valve head 14 are commonly of a one-piece construction. Moreover, the valve head 14 cooperates with an annular valve seat 16 attached to a housing which in the preferred embodiment illustrated includes a cylinder head 18 so that the upper axial end of the valve seat 16 is open to an exhaust passageway 20 while the lower end of the valve seat 16 is open to an engine cylinder 22. In a maner which will be subsequently described in greater detail, the valve stem 12 of the valve 10 is axially slidably mounted within the cylinder head 18 so that with the valve head 14 moved away from the valve seat 16, fluid communication from the cylinder 22 through the exhaust passageway 20 is permitted while, conversely, with the valve head 14 abutting against the valve seat 16, fluid communication between the cylinder 22 and exhaust passageway 20 is closed.

The valve stem 12 is slidably mounted within a valve guide 100 which is press fit into a bore 102 in the cylinder head 18. No fluid passageways are provided along the valve guide 100 as was done in my earlier U.S. patent application Ser. No. 831,384, now U.S. Pat. No. 4,184,328.

A liner 104 is positioned within the exhaust passageway 20 so that the liner 104 is spaced inwardly from the exhaust passageway 20. In addition, the liner 104 is closed at its outer end 106 to the cylinder head 18 and also engages the valve seat 16 through a circular opening 108 in the liner 104. The valve stem 12 extends through a further circular opening 110 in the liner 104 which is substantially larger in diameter than the valve stem 12.

The source of pressurized air 44 is connected through a fluid passageway 112 to the space 114 between the liner 104 and the cylinder head 18. Consequently, air flow from the source 44 flows through the passageway 112, into the space 114, around the liner 104 and exhausts through the liner opening 110. As before, air through the opening 110 flows downwardly along the lower portion of the valve stem 12 and across the upper axial end 46 of the valve head 14 in order to cool the same.

From the foregoing it can be seen that the air cooled exhaust valve according to the present invention provides a simple, inexpensive and yet totally effective means for cooling the engine exhaust valve. Moreover, unlike the previously-known air cooled valves, the cooling of the valve may be continuous and in practice effectively prevents heat warpage and breakage of the valve stem 12 and/or valve head 14.

Having thus described my invention, many modifications thereto will become apparent to those skilled in the art to which it pertains without deviation from the spirit of the invention as defined by the scope of the appended claims.

I claim:

1. A fluid cooled valve construction for an engine, said engine having a housing, said valve construction comprising:

a valve having an elongated stem and an enlarged valve head connected to one end of said stem, means for axially slidably mounting said stem in said housing, a source of pressurized fluid, supplying a continuous flow of cooling fluid, fluid passage means formed in said housing, said fluid passage means being fluidly connected at one end to said pressurized fluid source and fluidly connected at its other end to an annular opening around said valve stem adjacent said valve head whereby fluid continually flows through said opening, along said valve stem and across one axial end of said valve head to thereby cool said valve, wherein said engine housing includes a manifold passageway through which said valve head and a portion of said valve stem extend and wherein said passage means further comprises a liner positioned in said manifold passageway, said liner being spaced away from said manifold passageway and defining a fluid passage intermediate said housing and said liner, and wherein said annular opening is an opening through said liner, whereby cooling fluid continually flows through said annular opening, along said portion of said valve stem and across said valve head to thereby continuously cool said valve stem portion and valve head.

* * * * *

UNITED STATES PATENT AND TRADEMARK OFFICE
CERTIFICATE OF CORRECTION

PATENT NO. : 4,539,812

DATED : September 10, 1985

INVENTOR(S) : Bernard Rezy

It is certified that error appears in the above-identified patent and that said Letters Patent is hereby corrected as shown below:

Column 1, line 8 delete "granted Jan. 22, 1980".

Signed and Sealed this

Eleventh Day of March 1986

[SEAL]

Attest:

DONALD J. QUIGG

Attesting Officer

Commissioner of Patents and Trademarks